US012520965B2

United States Patent
Hipp et al.

(10) Patent No.: US 12,520,965 B2
(45) Date of Patent: Jan. 13, 2026

(54) COLLAPSIBLE CAMPING STOVE

(71) Applicant: TH Innovative Products, LLC, Wadsworth, IL (US)

(72) Inventors: Timothy Hipp, Wadsworth, IL (US); Jaicie Wilson, Wadsworth, IL (US)

( * ) Notice: Subject to any disclaimer, the term of this patent is extended or adjusted under 35 U.S.C. 154(b) by 607 days.

(21) Appl. No.: 17/107,400

(22) Filed: Nov. 30, 2020

(65) Prior Publication Data
US 2022/0167790 A1 Jun. 2, 2022

(51) Int. Cl.
*A47J 37/07* (2006.01)
*A47J 36/02* (2006.01)

(52) U.S. Cl.
CPC ........ *A47J 37/0763* (2013.01); *A47J 36/02* (2013.01); *A47J 37/0704* (2013.01); *A47J 37/0786* (2013.01); *A47J 2037/0777* (2013.01)

(58) Field of Classification Search
CPC ........ A47J 2037/0777; A47J 2037/0795; A47J 37/0786; A47J 37/0759; A47J 27/13; A47J 36/00; A47J 36/02; A47J 37/0704; A47J 37/0709; A47J 37/0713; A47J 37/0763; A47J 37/0768; A47J 37/0772; A47J 45/00; A47J 45/10; A47J 2201/00
USPC ............ 126/25 R, 29, 9 R, 9 B; 99/448–449
See application file for complete search history.

(56) References Cited

U.S. PATENT DOCUMENTS

| | | |
|---|---|---|
| 506,058 A | 10/1893 | Mings |
| 585,046 A | 6/1897 | Penfield |
| 617,122 A | 1/1899 | Ray |
| 700,356 A | 5/1902 | Mitchell |
| 718,412 A | 1/1903 | Bach |
| 781,758 A | 2/1905 | Annin |
| 906,801 A * | 12/1908 | Hickey ................ A47J 45/10 294/34 |
| 937,890 A | 10/1909 | Swinney |
| 961,975 A | 6/1910 | Long |
| 963,922 A | 7/1910 | McDaniels |
| 970,342 A | 9/1910 | Kurt |
| 1,094,151 A | 4/1914 | Kemp |
| 1,166,151 A | 12/1915 | Penn |
| 1,187,009 A | 6/1916 | Pickup |
| 1,241,760 A | 10/1917 | Penn |

(Continued)

FOREIGN PATENT DOCUMENTS

| | | |
|---|---|---|
| DE | 202016107218 | 3/2018 |
| GB | 335476 | 9/1930 |

(Continued)

*Primary Examiner* — Sang Y Paik
*Assistant Examiner* — Bonita Khlok
(74) *Attorney, Agent, or Firm* — Neal, Gerber & Eisenberg LLP (57) ABSTRACT

A collapsible camping stove is described that is lightweight and quick to assemble for cooking and putting away for storage. The collapsible camping stove includes telescoping rings with tabs of concentric rings inserted into slots of adjacent rings. The slots include horizontal and vertical portions so that the rings can be fastened in an expanded position by moving the tabs to the horizontal portions of the slots. A cooking grate is placed on top of an innermost telescoping ring. The outside cover covers the collapsible camping stove while fully collapsed. Methods of constructing the collapsible camping stove and methods of using the collapsible camping stove are also described.

11 Claims, 6 Drawing Sheets

(56) References Cited

U.S. PATENT DOCUMENTS

| | | |
|---|---|---|
| 1,247,806 A | 11/1917 | Ferdon |
| 1,404,314 A | 1/1922 | Olsen |
| 1,411,596 A | 4/1922 | Tallman |
| 1,569,401 A | 1/1926 | Sims |
| 1,780,068 A | 10/1930 | Dorman |
| 2,058,836 A | 10/1936 | Silver |
| 2,073,813 A | 3/1937 | Slezak |
| 2,076,783 A | 4/1937 | Jones |
| 2,095,654 A | 10/1937 | Thoreson |
| 2,119,798 A | 6/1938 | Sivey |
| 2,119,799 A | 6/1938 | Sivey |
| 2,424,665 A | 7/1947 | Pope, Sr. |
| 2,474,043 A | 6/1949 | Etches |
| 2,597,477 A | 5/1952 | Haislip |
| 2,747,566 A | 5/1956 | Werden |
| 2,985,164 A | 5/1961 | Imoto |
| 3,056,396 A | 10/1962 | Hochhalter et al. |
| 3,308,807 A | 3/1967 | Little et al. |
| 3,428,039 A | 2/1969 | Desmoulins |
| 3,489,131 A | 1/1970 | Richins |
| 3,559,633 A | 2/1971 | Born et al. |
| 3,663,081 A | 5/1972 | Williams |
| 3,698,376 A | 10/1972 | Webb |
| 3,809,054 A | 5/1974 | Bowman et al. |
| 3,812,839 A | 5/1974 | Helgeson |
| 4,069,806 A | 1/1978 | Landry |
| 4,140,099 A | 2/1979 | Newport |
| 4,347,830 A | 9/1982 | Runyan |
| 4,475,528 A | 10/1984 | Kuchenbrod |
| 4,526,158 A | 7/1985 | Lee |
| 4,531,505 A | 7/1985 | Hait et al. |
| 4,539,973 A | 9/1985 | Hait |
| 4,548,192 A | 10/1985 | Hsu |
| 4,569,327 A | 2/1986 | Velten |
| 4,598,690 A | 7/1986 | Hsu |
| 4,621,608 A | 11/1986 | Lee |
| 4,714,013 A | 12/1987 | Telfer |
| 4,896,651 A | 1/1990 | Kott, Jr. |
| 4,922,887 A | 5/1990 | Foxford |
| 5,038,749 A | 8/1991 | Jerry et al. |
| 5,119,799 A | 6/1992 | Cowan |
| 5,179,932 A | 1/1993 | DeCarlo |
| 5,404,864 A | 4/1995 | Kent, Jr. |
| 5,575,195 A | 11/1996 | Foxford |
| 5,713,343 A | 2/1998 | Taylor et al. |
| 5,713,344 A | 2/1998 | Gilbert |
| 6,003,506 A | 12/1999 | Long et al. |
| 6,035,768 A | 3/2000 | Kaufman |
| 6,041,773 A | 3/2000 | Rosenquist |
| 6,314,955 B1 | 11/2001 | Boetcker |
| 6,484,897 B1 * | 11/2002 | Crawley ............... B65D 81/24 |
| | | 220/8 |
| 6,543,435 B1 * | 4/2003 | Regen ................. A47J 37/0704 |
| | | 126/38 |
| 6,591,828 B1 | 7/2003 | Schneider |
| 6,708,604 B1 | 3/2004 | Deichler, Jr. |
| 6,851,419 B2 | 2/2005 | Reiner |
| 7,080,640 B2 | 7/2006 | Sanders et al. |
| 7,426,928 B2 | 9/2008 | Sanders et al. |
| D612,190 S | 3/2010 | Tenney et al. |
| 7,934,494 B1 | 5/2011 | Schneider |
| 8,261,731 B2 | 9/2012 | Marsh |
| 8,297,271 B2 | 10/2012 | Cedar et al. |
| D682,006 S | 5/2013 | Merkurieff |
| D693,623 S | 11/2013 | Merkurieff |
| 8,770,184 B2 | 7/2014 | Schneider |
| 8,851,062 B2 | 10/2014 | Cedar et al. |
| 9,657,950 B2 | 5/2017 | Boucher |
| 9,677,724 B2 | 6/2017 | McClean |
| 9,702,563 B2 | 7/2017 | Probst et al. |
| 9,808,116 B1 | 11/2017 | Mummert |
| 9,854,936 B2 | 1/2018 | Young |
| 9,867,496 B2 | 1/2018 | Heuchling |
| 9,877,611 B2 | 1/2018 | Andol |
| 9,970,661 B2 | 5/2018 | Calvin |
| 10,132,503 B2 | 11/2018 | Probst et al. |
| 10,292,531 B1 | 5/2019 | Hancock et al. |
| 10,457,189 B1 | 10/2019 | Gaw |
| 2003/0010332 A1 | 1/2003 | Mosher et al. |
| 2014/0069418 A1 | 3/2014 | Merkurieff |
| 2014/0209083 A1 | 7/2014 | Young |
| 2015/0291309 A1 * | 10/2015 | McGregor ........... B65D 21/086 |
| | | 220/573.1 |
| 2017/0219214 A1 | 8/2017 | Kuhn |
| 2017/0234544 A1 * | 8/2017 | Cuffaro ............... A47J 37/0763 |
| | | 126/9 R |
| 2018/0119960 A1 | 5/2018 | Fisher et al. |
| 2018/0220830 A1 * | 8/2018 | Carpenter ............... A47J 36/02 |
| 2019/0159623 A1 | 5/2019 | Fryshman |
| 2019/0159625 A1 | 5/2019 | Santiago |
| 2019/0223645 A1 | 7/2019 | Gauss et al. |
| 2019/0313851 A1 * | 10/2019 | Shemp ................. A47J 37/0718 |

FOREIGN PATENT DOCUMENTS

| | | |
|---|---|---|
| GB | 479133 | 2/1938 |
| GB | 2493108 | 1/2013 |
| JP | 2001041455 | 2/2001 |
| TW | M561762 | 6/2018 |
| WO | 9806980 | 2/1998 |
| WO | 0131259 | 5/2001 |
| WO | 2015087312 | 6/2015 |
| WO | 2016032966 | 3/2016 |
| WO | 2019057814 | 3/2019 |

\* cited by examiner

COLLAPSIBLE CAMPING STOVE

FIELD

The present disclosure relates to portable cooking devices, and methods of making and using portable cooking devices.

BACKGROUND

Outdoor recreation can include evenings in the wilderness and cooking out by a campfire. However, equipment that adequately cooks food can be difficult to assemble and cumbersome to transport. Some cooking equipment can take a long time to cool, or may be too large to fit into campers' backpacks. Because the outdoors are unpredictable, it is desirable to have lightweight camping stoves that campers can use to cook food quickly, including the ability to set up and take down a camp stove, if the campers are exposed to danger.

SUMMARY

The present disclosure provides solutions to the foregoing problems and/or other problems by providing a collapsible camping stove that can be easily transported, assembled, and stored. The collapsible camping stove can be assembled by fastening its telescoping rings in an expanded form, thereby providing a cooking grate that is positioned above a heat source within the uppermost/innermost ring. In some embodiments, the collapsible camping stove also includes an outside cover which can be used as a cooking pan, which reduces the number of cooking resources to be packed and transported. In some embodiments, the collapsible camping stove can be made of lightweight materials and/or materials that rapidly cool.

As one aspect of the present invention, a collapsible camping stove comprises a plurality of telescoping rings, wherein the plurality of telescoping rings comprises an innermost ring, one or more internal rings, and an outermost ring. Each of the internal rings has an exterior surface, an interior surface, one or more tabs extending from the exterior surface, and one or more slots in the interior surface. Each of the slots has a horizontal portion and a vertical portion. The innermost ring has an exterior surface and one or more tabs extending from the exterior surface. The tabs of the innermost ring are inserted in said one or more slots of an adjacent internal ring. The outermost ring has an interior surface and one or more slots in the interior surface. Each of the slots has a horizontal portion and a vertical portion. The tabs from an adjacent internal ring are inserted in the slots of the outermost ring. The collapsible camping stove also comprises a cooking grate extending across a top opening of the uppermost/innermost ring.

As another aspect of the present invention, a method of constructing a collapsible camping stove comprises obtaining a plurality of telescoping rings, wherein the plurality of telescoping rings comprises an innermost ring, one or more internal rings, and an outermost ring. Each of the internal rings has an exterior surface, an interior surface, one or more tabs extending from the exterior surface, and one or more slots in the interior surface. Each of the slots has a horizontal portion and a vertical portion. The innermost ring has an exterior surface and one or more tabs extending from the exterior surface, and the outermost ring has an interior surface and one or more slots in the interior surface, each slot having a horizontal portion and a vertical portion. The method also comprises inserting the tabs of the innermost ring into the slots of an adjacent internal ring, and inserting the tabs from an adjacent internal ring into the slots of the outermost ring. The method also comprises installing a cooking grate across a top opening of the uppermost/innermost ring.

As another aspect of the present invention, a method of using a collapsible camping stove comprises expanding a collapsible camping stove; starting a heat source inside the collapsible camping stove; cooking a food item on the collapsible camping stove; allowing the collapsible camping stove to cool; and collapsing the collapsible camping stove.

DETAILED DESCRIPTION

In the following detailed description, for purposes of explanation and not limitation, representative embodiments disclosing specific details are set forth in order to provide a thorough understanding of the present teachings. Descriptions or details of known systems, compounds, materials, methods of use and methods of manufacture may be omitted so as to avoid obscuring the description of the example embodiments. Nonetheless, systems and methods that are within the purview of one of ordinary skill in the art may be used in accordance with the representative embodiments.

As one aspect, the present disclosure provides various embodiments of a collapsible camping stove. In some embodiments, the horizontal and vertical portions of the slots in the collapsible camping stove, or the slots in one or more of its rings, form a plurality of ]-shaped or [-shaped slots. In some embodiments, each of the plurality of ]-shaped or [-shaped slots has a step down notch. In some embodiments, the slots in each of the internal rings and the outermost ring have substantially identical shapes. When the rings have substantially identical shapes and sizes, the collapsible camping stove can be fastened in an expanded form through rotation in one direction, such as through a partial rotation in a clockwise direction. In some embodiments, the tabs are locked in the horizontal portion of the slots in some manner. For instance, the tab can be formed of a material that expands when heated, and, as a result of such expansion, the tab is locked in the slot by friction.

The innermost ring, each of the internal rings, and the outermost ring each have an exterior circumference and an interior circumference separated by a sidewall. In some embodiments of the present devices and methods, the collapsible camping stove comprises one or more internal rings, such as a first internal ring, and a second internal ring. In some embodiments, the one or more internal rings includes a third internal ring. In some embodiments, the one or more internal rings includes a third internal ring and a fourth internal ring, though a greater or lesser number of internal rings may also be contemplated. The exterior circumferences of the innermost ring and each of the one or more internal rings decrease in the following order: the exterior circumference of the first internal ring is smaller than the interior circumference of the outermost ring; the exterior circumference of the second internal ring is smaller than the interior circumference of the first internal ring; the exterior circumference of the third internal ring is smaller than the interior circumference of the second internal ring; the exterior circumference of the fourth internal ring is smaller than the interior circumference of the third internal ring; and the exterior circumference of the innermost ring is smaller than the interior circumference of the fourth internal ring. In some embodiments, the tabs on the first internal ring extend no farther than the exterior circumference of the outermost ring; the tabs on the second internal ring extend no farther than the exterior circumference of the first internal ring; the tabs on the third internal ring extend no farther than the exterior circumference of the second internal ring; the tabs on the fourth internal ring extend no farther than the exterior circumference of the third internal ring; and the tabs on the innermost ring extend no farther than the exterior circumference of the fourth internal ring.

The collapsible camping stove can be formed from a rapidly cooling material, such as a rapidly cooling material selected from the group consisting of aluminum, aluminum alloy, steel, stainless steel and combinations thereof.

In some embodiments, the collapsible camping stove also comprises an outside cover. The outside cover comprises a bottom wall, a cover sidewall extending from the bottom wall, an open mouth defined by the sidewall, and a handle connector on an exterior surface of the outside cover. The handle connector on the exterior surface of the outside cover can be a bracket configured to engage a prong on an end of a pan handle. In some embodiments, the pan handle comprises two or more separable parts, wherein each of the separable pan handle parts has a length shorter than the interior circumference of the innermost ring. This facilitates storage of the pan handle inside the collapsible camping stove when collapsed. In some embodiments, a first part of the pan handle has a knob on a first side and a threaded screw opposite the knob and the second part of the pan handle has an opening on a first side and the prong opposite the first side. The threaded screw on the first part of the pan handle engages the opening on the second part of the pan handle to form the pan handle.

In some embodiments, the outermost ring of the collapsible camping stove further comprises a bottom wall, and said bottom wall defines an aperture for a heat source. In some embodiments, the bottom wall is separated from the outermost ring to form a hollow for the heat source. The heat source can be any mechanism for generating heat, such as a heat source that can be ignited like wood or STERNO® fuel.

As another aspect, the present disclosure provides various embodiments of a method of constructing a collapsible camping stove. In some embodiments, the method includes boring one or more slots through each of the one or more internal rings and boring one or more slots through the outermost ring. The term "boring" refers to any act of making or enlarging a hole. In some embodiments, the method includes adding one or more tabs on the exterior surface of the innermost ring, and/or adding one or more tabs on the exterior surface of each of the one or more internal rings. In some embodiments, the method includes forming an outside cover. In some embodiments, the method includes manufacturing a cooking grate configured to sit across a top opening of the innermost ring. In some embodiments, the cooking grate can be integrally formed in the innermost ring.

In some embodiments, the method of constructing a collapsible camping stove comprises assembling the collapsible camping stove by inserting the tabs of the innermost ring into the slots of an adjacent internal ring (that is, the internal ring whose interior circumference is closest to the exterior circumference of the innermost ring). The method also comprises inserting the tabs of the internal rings into the slots of adjacent rings (that is, into the internal ring which is next largest in circumference, followed by inserting the tabs of the largest internal ring into the slots of the outermost ring). For example, when the collapsible camping stove comprises four internal rings along with an innermost ring and an outermost ring, the method of constructing the camping stove can comprise inserting the tabs on a first internal ring into the slots on the outermost ring; inserting the tabs on the second internal ring into the slots on the first internal ring; inserting the tabs on the third internal ring into the slots on the second internal ring; inserting the tabs on the fourth internal ring into the slots on the third internal ring; and inserting the tabs on the innermost ring into the slots on the fourth internal ring.

In some embodiments, the method of constructing a collapsible camping stove comprises placing a cooking grate across a top opening of the innermost ring. The cooking grate can be integral with the innermost ring, or it can be a separate piece which sits on a top edge of the sidewall of the innermost ring or within recesses of the sidewall.

As yet another aspect, the present disclosure provides various embodiments of a method of using a collapsible camping stove. In some embodiments, the collapsible camping stove is expanded by lifting and rotating the innermost ring and the internal rings, wherein the lifting and rotating moves said tabs from the vertical portion to the horizontal portion of the slots. For instance, the innermost ring and the inner rings can be lifted vertically in a first motion, followed by rotating the innermost ring and the inner rings in a second motion. The methods can also include placing a heat source within the outermost ring of the expanded collapsible camping stove and igniting the heat source. In some embodiments, placing the heat source includes separating a bottom wall of an interior surface of the outermost ring from the outermost ring to form a hollow and placing the heat source within the hollow. After using the collapsible camping stove for cooking, it is allowed to cool. In some embodiments, the collapsible camping stove is collapsed by rotating the innermost ring and the one or more internal rings in a direction opposite the second motion responsible for rotating and expanding the collapsible camping stove. The methods of use can also include storing the telescoping rings within an outside cover.

Figure 1:
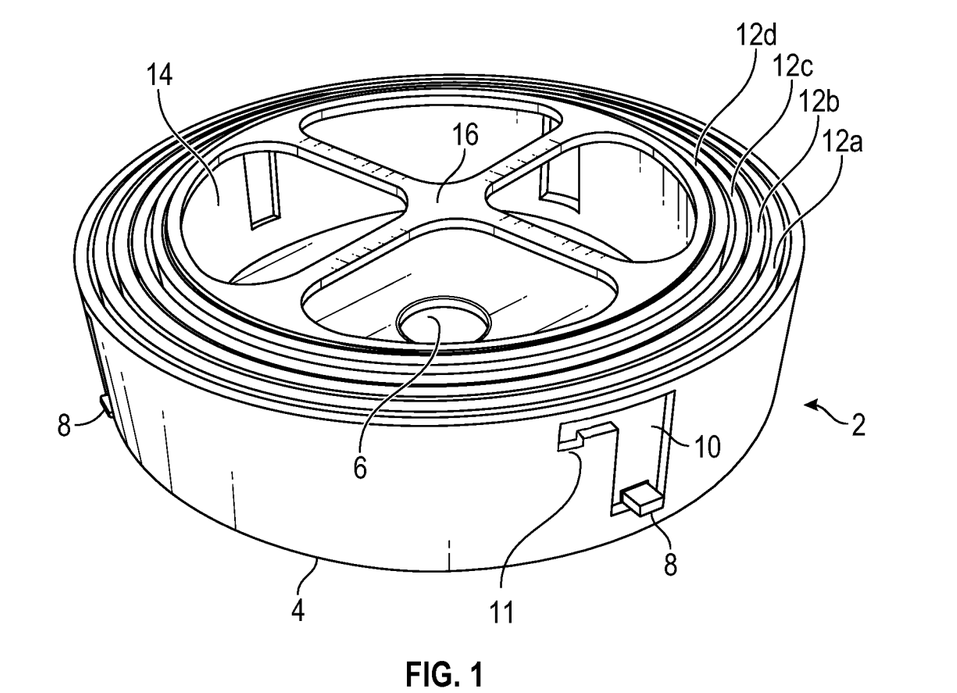
FIG. 1 is a front view and embodiment of the collapsible camping stove when the collapsible camping stove is fully retracted.

FIG. 1 illustrates a front view and exemplary embodiment of a collapsible camping stove 2 when the collapsible camping stove 2 is retracted. The collapsible camping stove 2 has an outermost ring 4. The outermost ring 4 has an exterior surface and an interior surface. The interior surface of the outermost ring 4 has a bottom wall that defines an aperture 6. When the collapsible camping stove 2 is used for cooking, a heat source, not shown, is placed in the aperture 6 of the interior surface of the outermost ring 4 to heat the collapsible camping stove 2. In some embodiments, the bottom wall is separated from the interior surface of the outermost ring 4 to form a hollow, not shown, for the heat source. The collapsible camping stove 2 also has internal rings 12a, 12b, 12c and 12d, and an innermost ring 14. Each of the outermost ring 4, the innermost ring 14 and the internal rings 12a, 12b, 12c, and 12d has an interior circumference and an exterior circumference. The exterior circumferences of the innermost ring 14 and the internal rings 12a, 12b, 12c, and 12d are smaller than the interior circumference of the outermost ring 4. Tabs 8 are located on an exterior surface of each of the internal rings 12a, 12b, 12c and 12d, and the innermost ring 14. Slots 10 are located in the outermost ring 4. The slots 10 have a vertical and horizontal portion. In some embodiments, the horizontal and vertical portions form a ]-shape or ⌈-shape. In some embodiments, each of the horizontal portions has a step down notch 11. The tabs 8 on the exterior surface of internal ring 12a interact with the slots 10 on the exterior surface of the outermost ring 4 in both the vertical position and the horizontal position, not shown. A cooking grate 16 is placed across a top opening of the innermost ring 14. In some embodiments, the cooking grate 16 is integrally formed with the innermost ring 14.

Figure 2:
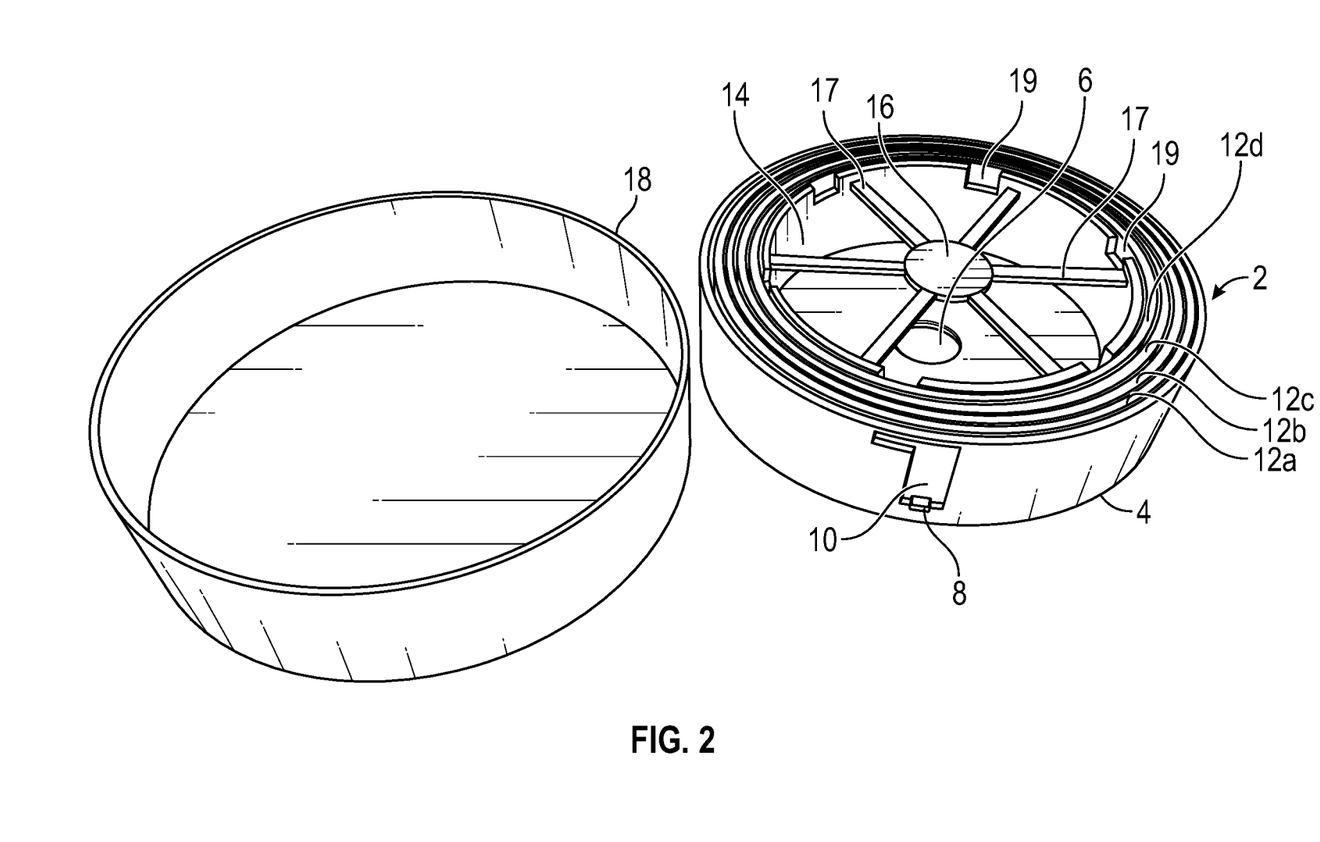
FIG. 2 is a front view and embodiment of the collapsible camping stove and the outside cover when the collapsible camping stove is fully retracted.

FIG. 2 illustrates another embodiment and view of the collapsible camping stove 2 when the collapsible camping stove 2 is retracted. As described in FIG. 1, the collapsible camping stove 2 has an outermost ring 4. Further, as described in FIG. 1, an interior surface of the outermost ring 4 has a bottom wall defining an aperture 6, multiple slots 10, which receive the tabs 8 on the innermost ring 14 and the internal rings 12a, 12b, 12c and 12d. The slots 10 have vertical and horizontal portions. In some embodiments, the horizontal and vertical portions form an ]-shape or ⌈-shape. In some embodiments, each of the horizontal portions has a step down notch 11. In the depicted embodiment, the cooking grate 16 is separable from the innermost ring 14, which optionally has notches 19 configured to receive spokes 17 of the cooking grate 16. An outside cover 18 has an external circumference larger than the external circumference of the outermost ring 4, so that it can envelop the collapsible camping stove 2 when the collapsible camping stove 2 is fully retracted and not in use, making storage more convenient. The outside cover 18 and the collapsible camping stove 2 can be made from materials that cool rapidly after heat exposure and are selected from the group consisting of aluminum, aluminum alloy, steel, stainless steel and combinations thereof.

In some embodiments, the bottom wall of the interior surface is separated from the outermost ring 4 to form a hollow, not shown, as described in FIG. 1. The outermost ring 4 has a slot 10 which receives a tab 8 on internal ring 12a, as described in FIGS. 1 and 2. The slot 10 has vertical and horizontal portions. In some embodiments, the horizontal and vertical portions form an ]-shape or ⌈-shape. In some embodiments, the horizontal portion has a step down notch 11.

Figure 3:
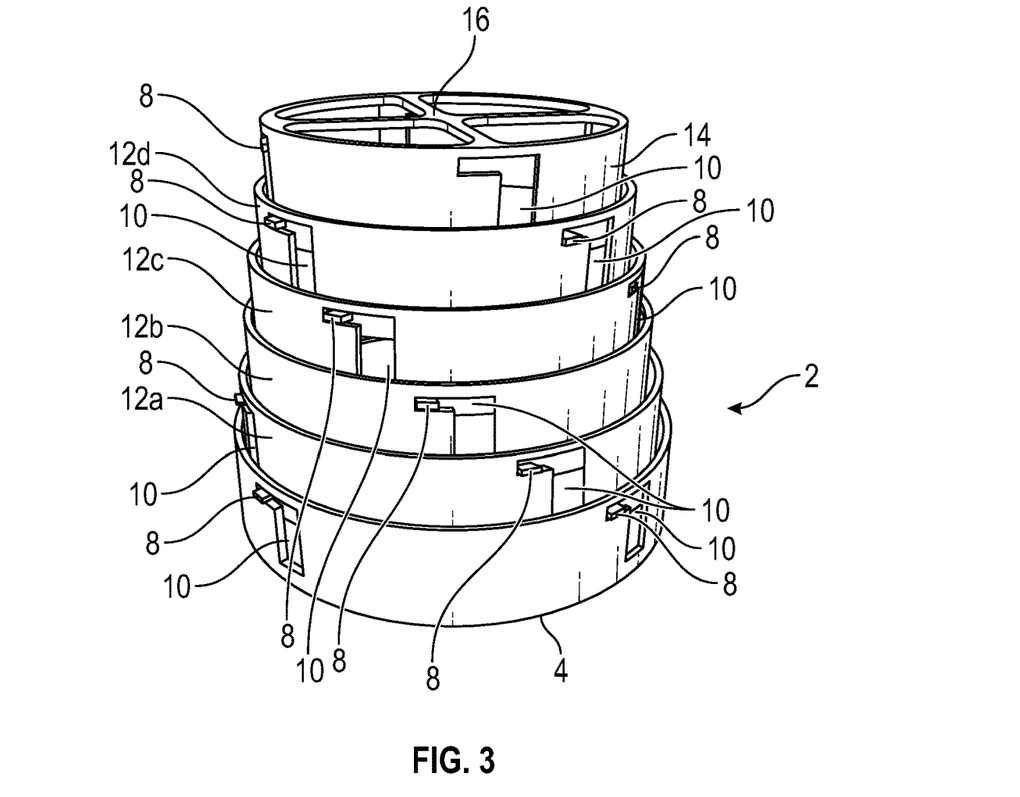
FIG. 3 is a perspective view and embodiment of the collapsible camping stove when the collapsible camping stove is fully expanded and fastened in expanded form.

FIG. 3 illustrates a perspective view and an embodiment of the collapsible camping stove 2 when fully expanded with the rings fastened into place. As described in FIGS. 1 and 2, the collapsible camping stove 2 includes an outermost ring 4; internal rings 12a, 12b, 12c, and 12d; and an innermost ring 14. As described above in FIGS. 1 and 2, an exterior surface of the outermost ring 4 has multiple slots 10 that join with tabs 8 on the exterior surface of internal ring 12a. As described in FIGS. 1 and 2, an interior surface of the outermost ring 4 has a bottom wall defining an aperture 6. In some embodiments, as described above in FIGS. 1 and 2, the bottom wall of the interior surface is separated from the outermost ring 4 to form a hollow, not shown. Slots 10 are also located on an exterior surface of the internal rings 12a, 12b, 12c, and 12d. The slots 10 have vertical and horizontal portions. In some embodiments, the horizontal and vertical portions of the slots 10 form an ]-shape or ⌈-shape. In some embodiments, each of the horizontal portions has a step down notch 11. The tabs 8 enter the horizontal portions of the slots 10 and fasten the outermost ring 4 and internal ring 12a into place. The subsequent steps to fully expand and fasten the collapsible camping stove 2 into place include: engaging the tabs 8 on the exterior surface of internal ring 12b with the horizontal portions of the slots 10 on the exterior surface of internal ring 12a; engaging the tabs 8 on the exterior surface of internal ring 12c with the horizontal portions of the slots 10 on the exterior surface of internal ring 12b; engaging the tabs 8 on the exterior surface of internal ring 12d with the horizontal portions of slots 10 on the exterior surface of internal ring 12c; and engaging the tabs 8 on the exterior surface of the innermost ring 14 with the horizontal portions of slots 10 on the exterior surface of internal ring 12d. As described in FIGS. 1 and 2, the cooking grate 16 is positioned across a top opening of the innermost ring 14. The cooking grate 16 can be integral with the innermost ring 14, or it can be a separate piece.

Figure 4A:
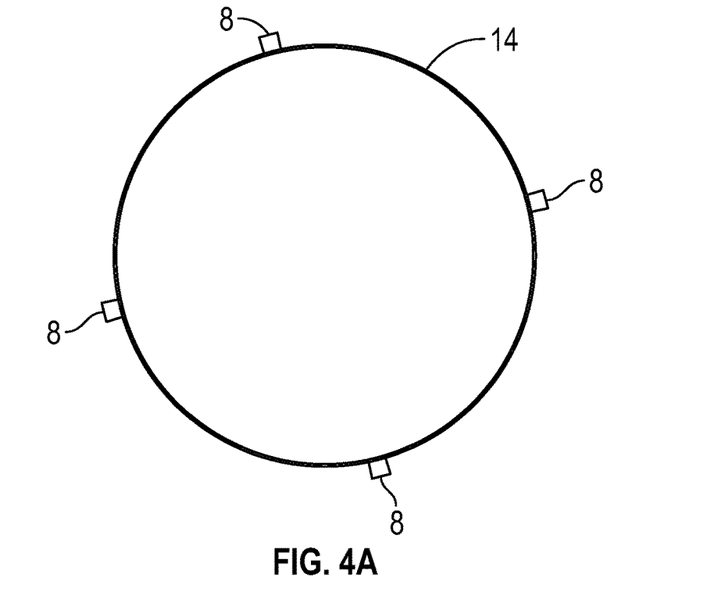
FIG. 4A is a plan view and embodiment of the innermost ring.
Figure 4B:
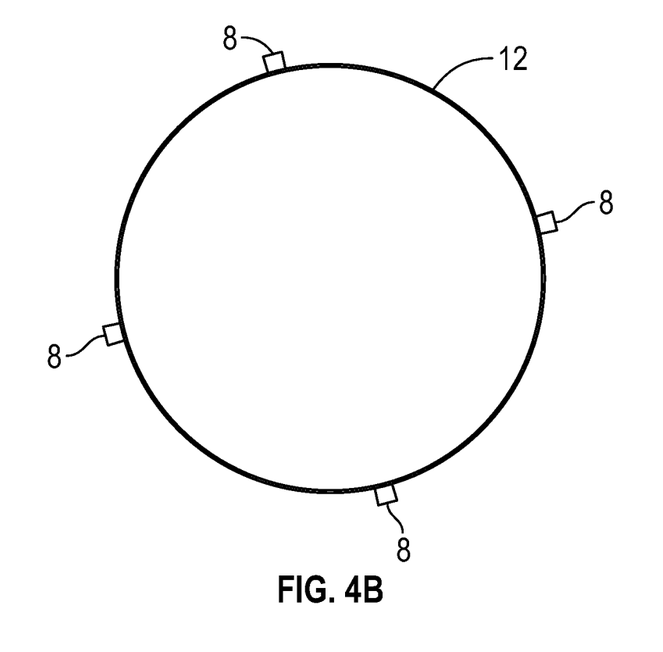
FIG. 4B is a plan view and embodiment of an internal ring.

FIGS. 4A and 4B illustrate a plan view and embodiment of the innermost ring 14 and an internal ring 12.

FIG. 4A illustrates a plan view and embodiment of the innermost ring 14. Tabs 8 are manufactured and located on the exterior surface of the innermost ring 14. The innermost ring 14 has an exterior circumference that is smaller than any of the interior circumferences of internal rings 12a, 12b, 12c, and 12d, not shown. The tabs 8 extend a distance that is essentially the same as the exterior circumference of the ring that surrounds the innermost ring 14. In some embodiments, as described in FIGS. 1, 2 and 3, the innermost ring 14 has a cooking grate 16 positioned across a top opening of the innermost ring. In some embodiments, the cooking grate 16 is integrally formed with the innermost ring 14. As described below in FIG. 5D, a cooking pan 28 can be placed on the cooking grate 16 of the collapsible camping stove 2 to cook foods placed in the cooking pan 28.

FIG. 4B illustrates a plan view and embodiment of internal ring 12. Tabs 8 are manufactured and located on the exterior surface of the internal ring 12. Each internal ring has an exterior and interior circumference. As each internal ring is stacked, the exterior circumference of each subsequently stacked internal ring decreases.

FIGS. 5A, 5B, 5C, and 5D illustrate views and an embodiment of the components and assembly of a cooking pan 28.

Figure 5A:
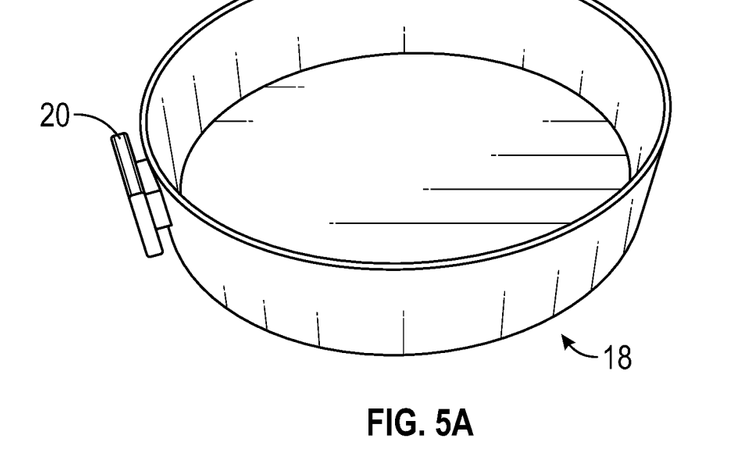
FIG. 5A is a side view and embodiment of the outside cover.
Figure 5B:
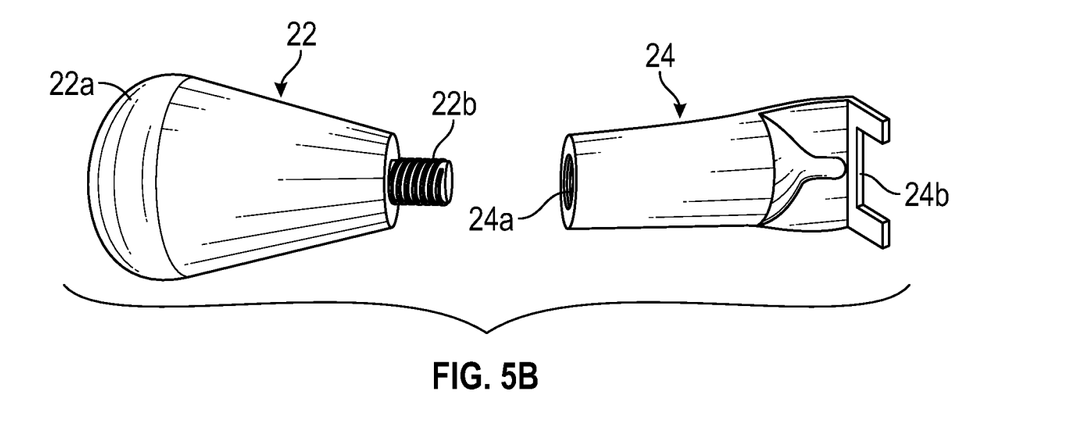
FIG. 5B is an exploded side view and embodiment of the pan handle.
Figure 5C:
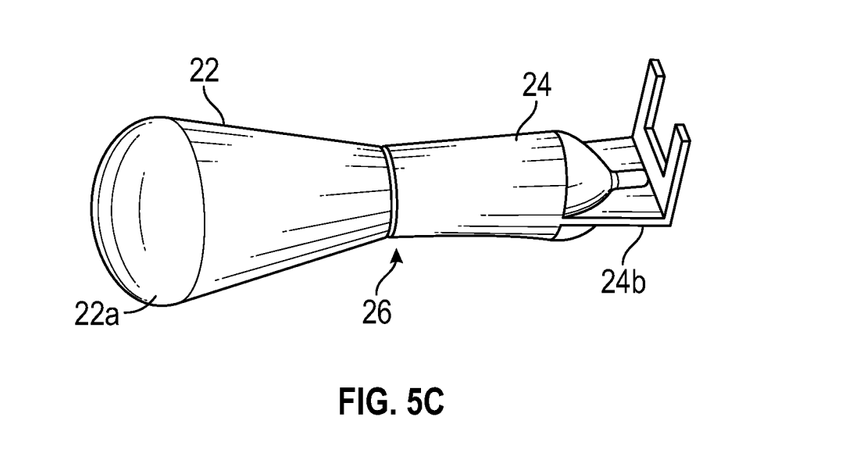
FIG. 5C is a side view and embodiment of the pan handle.
Figure 5D:
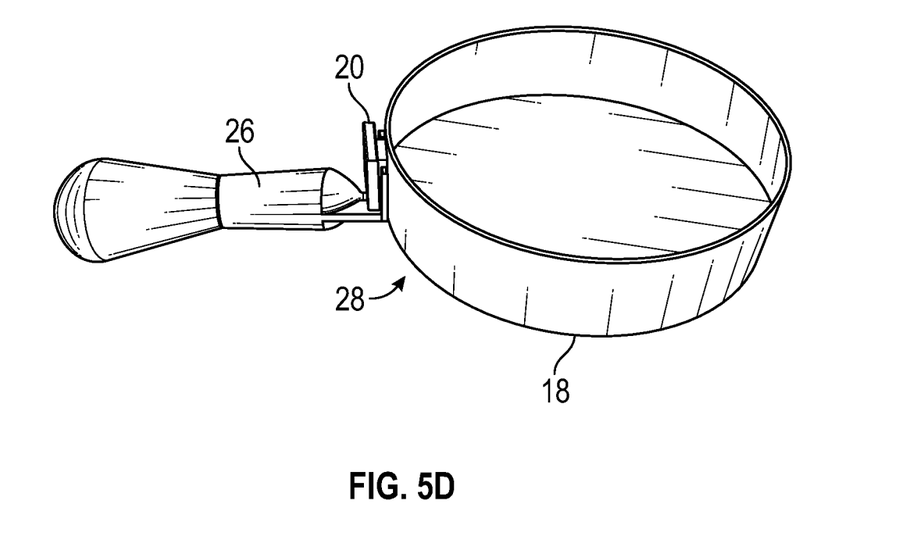
FIG. 5D is a side view and embodiment of the cooking pan.

FIG. 5A illustrates a side view and embodiment of an outside cover 18 for a collapsible camp stove 2. The outside cover 18 has a handle connector 20 on an exterior surface of the outside cover 18. The handle connector 20 can be a bracket configured to engage a prong 24b on a second part of a pan handle 26 as shown in FIGS. 5B to 5D. The handle connector 20 on the exterior surface of the outside cover 18 and the outside cover 18 are made of materials that cool rapidly after heat exposure, selected from the group consisting of aluminum, aluminum alloys, steel, stainless steel and combinations thereof.

FIG. 5B illustrates an exploded view and embodiment of a pan handle 26. The pan handle 26 has a first part 22 and a second part 24. The first part 22 of the pan handle 26 has a knob 22a on a first side and a threaded screw 22b opposite the knob 22a. The second part 24 of the pan handle 26 has an opening 24a on a first side and a prong 24b opposite the first side for attachment to the handle connector 20 on the exterior surface of the outside cover 18. The pan handle 26 is formed by engaging the threaded screw 22b on the opposite end of the first part 22 with the opening 24a on the primary end of the second part 24.

FIG. 5C illustrates a side view and embodiment of the pan handle 26. The pan handle 26 has the first part 22 and the second part 24. Knob 22a on the first part 22 allows the pan handle 26 to be held. Prong 24b on the second part 24 of the pan handle 26 receives the handle connector 20 on the exterior surface of the outside cover 18, shown in FIG. 5A, to form the cooking pan 28, shown in FIG. 5D.

FIG. 5D illustrates a side view and embodiment of the cooking pan 28. The cooking pan 28 includes the pan handle 26 and the outside cover 18. Handle connector 20 on the exterior surface of the outside cover 18 engages prong 24b, not shown, to form the flying pan 28, as discussed in FIG. 5C. The cooking pan 28 can be placed on the cooking grate 16 of the collapsible camping stove 2. A heat source, not shown, can be placed in the aperture 6 of the interior surface of the outermost ring 4. In some embodiments, the interior surface of the outermost ring 4 has a bottom wall defining the aperture 6, as described in FIGS. 1, 2 and 3. In some embodiments, the bottom wall is separated from the outermost ring 4 to form a hollow, not shown, for the heat source, not shown, as described in FIGS. 1, 2 and 3. The cooking pan 28 can be used to cook foods placed in the cooking pan 28.

Figure 6:
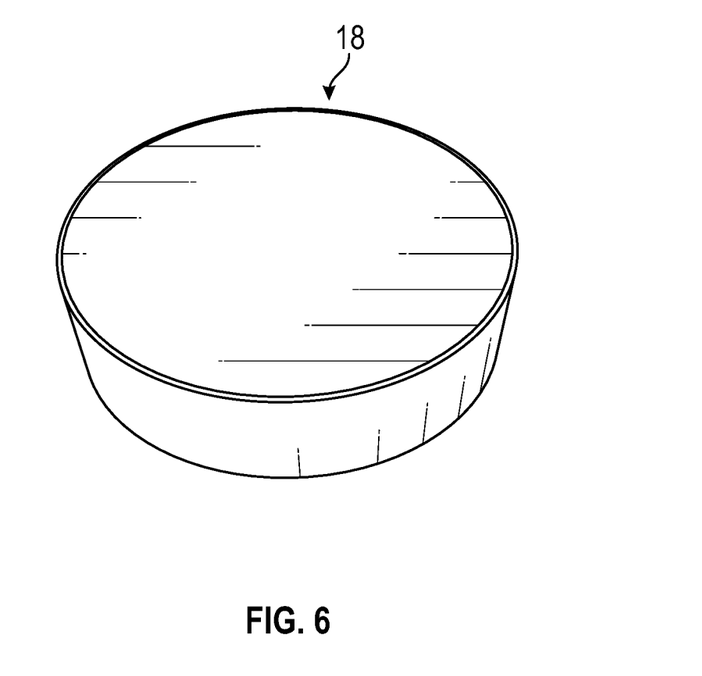
FIG. 6 is a plan view and embodiment of the outside cover enveloping the retracted collapsible camping stove.

FIG. 6 illustrates a plan view and embodiment of the collapsible camping stove 2 when the collapsible camping stove 2 is fully retracted and enveloped by the outside cover 18. Both the outside cover 18 and the collapsible camping stove 2 can be made of rapidly cooling materials selected from the group consisting of aluminum, aluminum alloy, steel, stainless steel and combinations thereof. The rapidly cooling materials can be lightweight and allow the collapsible camping stove 2 and the outside cover 18 to be transported.

The slots can be any suitable shape which comprises a horizontal portion and a vertical portion. In some embodiments, each of the horizontal portions has a step down notch. For example, the slot can have an ] shape (180° rotated L), a ⌈ (gamma) shape, a T shape, an E shape, a Z shape, a Π (pi) shape, a Σ (sigma) shape, or other shape. The slots are present in the ring, generally in a sidewall of the ring. In some embodiments, a slot passes through the entire sidewall of a ring; in others, a slot is a recess on in the interior surface of the sidewall of a ring.

Defined Terminology

It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an" and "the" include both singular and plural referents, unless the context clearly dictates otherwise. Thus, for example, "an internal ring" includes one internal ring and plural internal rings.

The term "telescoping" refers to a structure comprising concentric parts which can slide or otherwise move past each other so they can expand and retract. Telescoping parts may be in contact with each other before, during or after they move past each other, or they may be separated by an intermediate, such as a layer or a lubricant.

The term "rapidly cooling" refers to the time for the collapsible camping stove to reach an ambient temperature after heating. In some embodiments, this time can range from 3 to 5 minutes. The term "ambient temperature" refers to the temperature of the immediate surroundings. A suitable ambient temperature is between 15 and 30° C.

The term "lightweight" refers to a weight which is easily lifted or carried by a person. In some embodiments, the lightweight collapsible camping stove and the outside cover has a total weight less than 2 pounds; alternatively, the total weight is 1.4 pounds or less.

The term "ring" refers to a substantially circular structure, generally with a wall surrounding or defining an aperture. A ring can be an oval or ellipse.

The term "fastening" refers to maintaining the collapsible camping stove in a position, such as an upright and fully expanded position. The term "locking" refers to fastening in a manner that prevents movement of a tab out of a slot or out of a portion of a slot.

The disclosures of all patents, publications and literature identified herein are specifically incorporated herein by reference.

What is claimed is:

1. A collapsible camping stove comprising:
   a plurality of telescoping rings, wherein the plurality of telescoping rings comprises an innermost ring, one or more internal rings, and an outermost ring;
   each of the one or more internal rings has an exterior surface, an interior surface, one or more tabs extending from the exterior surface, and one or more slots in the interior surface, wherein each of the slots has a horizontal portion and a vertical portion;
   the innermost ring has an exterior surface and one or more tabs extending from the exterior surface, and said one or more tabs of the innermost ring are inserted in said one or more slots of an adjacent internal ring;
   the outermost ring has an interior surface and one or more slots in the interior surface, wherein each of the slots has a horizontal portion and a vertical portion, and said one or more tabs from an adjacent internal ring are inserted in said one or more slots of the outermost ring;
   wherein the horizontal and vertical portions of each of said one or more slots of the outermost ring and the internal rings form a plurality of ]-shaped or ⌈-shaped slots, whereby the collapsible camping stove can be fastened in an expanded form through lifting the innermost ring and the internal rings and rotation of the innermost ring and the internal rings in one direction, whereby said one or more tabs of the innermost ring are inserted in the horizontal portions of said one or more slots of the adjacent internal ring and said one or more tabs of the internal rings are inserted in the horizontal portions of said one or more slots of one of the adjacent internal rings or of the outermost ring, and whereby the collapsible camping stove can be collapsed by rotation of the innermost ring and the internal rings in a direction opposite said one direction, and
   a cooking grate extending across a top opening of the innermost ring.

2. The collapsible camping stove of claim 1, wherein each of the plurality of ]-shaped or ⌈-shaped slots has a step down notch.

3. The collapsible camping stove of claim 2, wherein said one or more slots in each of the one or more internal rings and the outermost ring have substantially identical shapes.

4. The collapsible camping stove of claim 1, wherein the plurality of telescoping rings is formed from a rapidly cooling material.

5. The collapsible camping stove of claim 4, wherein the rapidly cooling material is selected from the group consisting of aluminum, aluminum alloys, steel, stainless steel and combinations thereof.

6. The collapsible camping stove of claim 1, further comprising an outside cover, wherein the outside cover comprises a bottom wall, a sidewall extending from the bottom wall, an open mouth defined by the sidewall, and a handle connector on an exterior surface of the outside cover.

7. The collapsible camping stove of claim 6, wherein the handle connector on the exterior surface of the outside cover comprises a bracket configured to engage a prong on an end of a pan handle.

8. The collapsible camping stove of claim 7, wherein the pan handle comprises two or more separable parts, wherein each of the separable pan handle parts has a length shorter than an interior circumference of the innermost ring.

9. The collapsible camping stove of claim 8, wherein a first part of the pan handle has a knob on a first side and a threaded screw opposite the knob and the second part of the pan handle has an opening on a first side and the prong opposite the first side, wherein the threaded screw on the first end of the pan handle engages the opening on the second end of the pan handle to form the pan handle.

10. The collapsible camping stove of claim 1, wherein the outermost ring further comprises a bottom wall, and said bottom wall defines an aperture for a heat source.

11. The collapsible camping stove of claim 1, wherein the one or more internal rings comprises a first internal ring, a second internal ring, a third internal ring, and a fourth internal ring,
wherein the innermost ring, the one or more internal rings, and the outermost ring have an exterior circumference and an interior circumference separated by a ring sidewall, and
wherein the exterior circumference of the innermost ring and each of the one or more internal rings decreases in the following order:
the exterior circumference of the first internal ring is smaller than the interior circumference of the outermost ring;
the exterior circumference of the second internal ring is smaller than the interior circumference of the first internal ring;
the exterior circumference of the third internal ring is smaller than the interior circumference of the second internal ring;
the exterior circumference of the fourth internal ring is smaller than the interior circumference of the third internal ring; and
the exterior circumference of the innermost ring is smaller than the interior circumference of the fourth internal ring.

\* \* \* \* \*